United States Patent [19]
Raupp

[11] 3,722,535
[45] Mar. 27, 1973

[54] POSITIVE AND NEGATIVE PRESSURE RESPONSIVE RESERVOIR BREATHER

[75] Inventor: Ray J. Raupp, Lake Orion, Mich.

[73] Assignee: The Bendix Corporation, Southfield, Mich.

[22] Filed: May 26, 1971

[21] Appl. No.: 146,941

[52] U.S. Cl............................137/493.4, 137/493.6
[51] Int. Cl..........................F16k 45/00, F16k 17/00
[58] Field of Search...137/493.6, 493.4, 493.5, 493.9

[56] References Cited

UNITED STATES PATENTS

| | | | |
|---|---|---|---|
| 1,153,770 | 9/1915 | Daymon | 137/493.5 X |
| 2,299,367 | 10/1942 | Webb | 137/493.4 |
| 2,162,743 | 6/1939 | Norbom | 137/493.4 |
| 2,995,148 | 8/1961 | Novak et al. | 137/493.4 |

FOREIGN PATENTS OR APPLICATIONS

| | | | |
|---|---|---|---|
| 6,690 | 3/1902 | Great Britain | 137/493.6 |
| 681,089 | 9/1939 | Germany | 137/493.4 |

*Primary Examiner*—Henry T. Klinksiek
*Assistant Examiner*—Robert J. Miller
*Attorney*—Lester L. Hallacher and Plante, Hartz, Smith and Thompson

[57] ABSTRACT

The invention is directed to a breather for the reservoir of a hydraulic system. Pressure surges occasioned by the flow of large volumes of fluid into and out of the reservoir during the operation of the system are prevented. The breather is responsive to both positive and negative pressure changes, and accordingly maintains a relatively constant pressure within the reservoir. A first pressure responsive member is spring-biased and linearly moved to expel air from the reservoir in response to positive pressure buildups within the reservoir. A second pressure responsive member is carried by the first member and is spring-biased to move relative to the first member to admit air into the reservoir in response to negative pressures.

2 Claims, 4 Drawing Figures

PATENTED MAR 27 1973

3,722,535

INVENTOR
RAY J. RAUPP

BY Lester L. Wallacher

ATTORNEY 3,722,535

POSITIVE AND NEGATIVE PRESSURE RESPONSIVE RESERVOIR BREATHER

BACKGROUND OF THE INVENTION

Most types of hydraulic equipment include a reservoir which contains a supply of hydraulic fluid. As the hydraulic system is operated the changes in positioning of the various elements within the hydraulic system cause a change in the volume of hydraulic fluid within the reservoir. As a consequence the air within the reservoir undergoes pressure changes because the volume of the air obviously changes inversely with that of the fluid. In order to prevent large deviations of the pressure within the reservoir above and below the desired pressure, it is necessary to vent the reservoir to the atmosphere. Because of the vent, fluid entering the reservoir causes air to be expelled from the reservoir into the atmosphere instead of building up a high pressure. Alternatively, when fluid leaves the reservoir, gas enters the reservoir from the atmosphere, thereby relieving the vacuum or negative pressure and consequently maintaining the air pressure within the reservoir at a constant which is roughly equal to the atmospheric pressure. Direct venting into the atmosphere is not desirable because all forms of foreign matter can enter the reservoir through the open vent. Furthermore, when the hydraulic system is not in operation it is preferably that it be sealed so that it is not subjected to environmental conditions. Also, in many hydraulic systems it is preferable to maintain the reservoir pressure at a level above atmospheric. It is therefore desirable to have a reservoir breather which maintains a relatively constant pressure within the reservoir but which keeps the reservoir sealed when the hydraulic system is not in operation and which is capable of maintaining a constant pressure above atmospheric within the reservoir.

SUMMARY OF THE INVENTION

The inventive device provides both positive and negative pressure stabilization in the reservoir tank of a hydraulic system. The inventive relief device includes two pressure responsive elements, one of which responds to positive pressures to allow the egress of pressurized air from the reservoir to the atmosphere while the other element responds to negative pressure to allow atmospheric air to enter the reservoir tank to increase the pressure therein. The negative pressure responsive element is supported by the positive pressure responsive element so that the two elements can move in unison under certain conditions. The positive pressure responsive element is biased closed by a pressure spring which has a spring constant determined by the desired maximum pressure within the tank. The negative pressure responsive element also is spring-biased to be normally closed and the spring has a spring constant which is chosen to maintain the preferred constant pressure within the reservoir.

When the pressure within the reservoir increases above the preferred constant value, the two elements move in unison until the low pressure element is detented, at which time the high pressure element continues to move, thereby releasing pressurized air from the reservoir. When the pressure reaches the approximate preferred value, the spring against which the element moves biases the element closed to maintain the pressure within the reservoir.

When the pressure within the reservoir falls below the constant value — that is, becomes a negative pressure — the low pressure element moves away from the high pressure element, thereby admitting air into the reservoir chamber. As the pressure within the reservoir increases, the low pressure element is gradually biased closed so that it is completely closed at the approximate preferred pressure.

Because of the simultaneous movement of the two pressure elements under the high pressure condition and the sole movement of the low pressure element under the low pressure condition, chatter between the elements is avoided under those conditions when the pressure within the reservoir is approaching the preferred pressure and also when large sudden surges of fluid into or out of the reservoir cause a rapid change of pressure within the reservoir.

DETAILED DESCRIPTION

Figure 1:
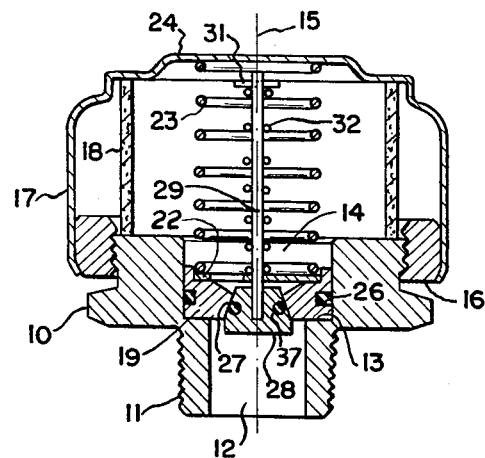
FIG. 1 is a preferred embodiment of the inventive device in the natural closed condition.

The preferred embodiment shown in FIG. 1 includes a Base 10 having a Stem Portion 11 which is used to couple the breather mechanism to the reservoir of the hydraulic system. Stem Portion 11 therefore can be provided with threads or any other known type of convenient coupling to connect it to the reservoir (not shown).

Coaxial with the Center Line 15 of Base 10 is an Orifice 12 which communicates the interior of the breather mechanism with the interior of the reservoir to which the breather is coupled. Orifice 12 extends along the Center Line 15 of Base 10 until it widens at a Stepped Portion 13 to form the widened Orifice 14.

An Annular Ring 16 is threadedly coupled to Base 10 to provide a support for a Housing Member 17 which is used to enclose the pressure-sensitive mechanism. Housing 17 will contain some orifices or some other communication with the atmosphere (not shown) so that atmospheric air can freely ingress and egress.

An Annular Filter Member 18 is retained between Base 10 and Housing 17 so that dust, moisture, and other foreign material is filtered from the atmospheric air entering the reservoir through the breather to thereby avoid contaminating the hydraulic fluid in the reservoir.

A movable Annular Ring 19 is positioned in the widened Portion 14 of Orifice 12. Ring 19 includes a Shoulder Portion 21 which supports a Valve Guide 22. A Positive Pressure Spring 23 is positioned between Valve Guide 22 and the uppermost Portion 24 of Housing 17. Pressure Spring 23 therefore biases Annular Ring 19 against the Shoulder 13 of Orifice 12. If desired an O-Ring 26 can be provided to prevent air leakage along the sides of Annular Ring 19.

Annular Ring 19 includes a Communication 27, the walls of which converge toward the interior of the breather mechanism. Ring 19 serves as the high pressure responsive element in a manner described hereinafter.

A Valve 28 which is configured congruently with Orifice 27 of Annular Ring 19 is positioned within Orifice 27. A Stem 29 is rigidly coupled to Valve 28 and extends almost completely through the interior of the breathing mechanism. Near the upper portion of Stem 29 is a small Shoulder 31. A low pressure responsive Spring 32 is positioned between Shoulder 31 and Valve Guide 22 so that Valve 28 is normally biased upwardly into Orifice 27, thereby sealing the communication and preventing fluid flow through Annular Ring 19. If desired an O-Ring 37 can be placed around Valve 28. Valve 28 and Stem 29 form the negative pressure responsive element. It will be noted that the air pressure within the reservoir also acts to bias Valve 28 closed.

Figure 4:
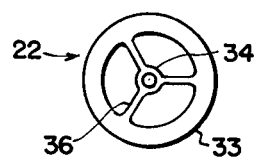
FIG. 4 shows a valve guide which is used to maintain the desired positioning of the two movable elements.

Valve 28 and Stem 29 are retained in a coaxial position with respect to Center Line 15 of the breather mechanism by Valve Guide 22 shown in FIG. 4. Valve Guide 22 includes an Outer Ring 33 and and Inner Ring 34 which are coupled by Support Members 36 so that a rigid structure is realized. Outer Ring 33 rests in Shoulder 21 of Annular Ring 19 and the outside diameter of Ring 33 is substantially equal to the diameter of Shoulder 21 so that the central axis of Valve Guide 22 is coincident with the Center Line 15 of the breather mechanism. Inner Ring 34 has an inside diameter which is slightly larger than Stem 29 so that the stem can pass through the ring and slide with respect thereto. As a consequence, as Valve 28 and Stem 29 slide up and down along Center Line 15 of the breather mechanism lateral movement of Stem 29 and Valve 28 is prevented and the longitudinal axis of the negative pressure responsive element is held substantially parallel to the Center Line 15 of the breather mechanism.

Figure 2:
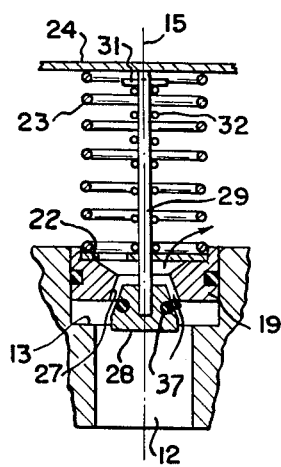
FIG. 2 is a segmented view of the preferred embodiment under the high pressure condition.

FIG. 1 shows the condition of the inventive breather when it is in its natural state - that is, when the pressure within the reservoir is at the desired value. FIG. 2 shows the operation of the mechanism when the pressure within the reservoir increases because of the flow of hydraulic fluid into the reservoir. When the pressure within the reservoir rises above a value determined by the spring constant of Spring 23, Annular Ring 19 and Valve 28 move in unison in Orifice 14 along Center Line 15. It will be noted that the simultaneous movement of Annular High Pressure Ring 19 and Valve 28 is not retarded by Spring 32 because the elements which hold Spring 32 in place also move along with High Pressure Ring 19. The simultaneous movement of High Pressure Ring 19 and Low Pressure Valve 28 continues until the end of Stem 29 comes in contact with the Upper Portion 24 of Housing 17. At this point Valve 28 and Stem 29 are restrained from moving, and therefore High Pressure Ring 19 continues its upward motion thereby allowing air to pass through Orifice 27 along the sides of Valve 28, thereby relieving the pressure within the reservoir. As the pressure within the reservoir decreases it ceases to push Annular High Pressure Ring 19 upwardly so that the force of Spring 23 exceeds the pressure force and moves downwardly, thereby closing the communication between Orifice 27 and Valve 28, shutting off the release of air from the tank. It will be noted that after Stem 29 contacts Casing 17 the upward movement of High Pressure Ring 19 is against both Springs 23 and 32. Spring 32 therefore contributes to the termination of the pressure at which the relief mechanism recloses.

Figure 3:
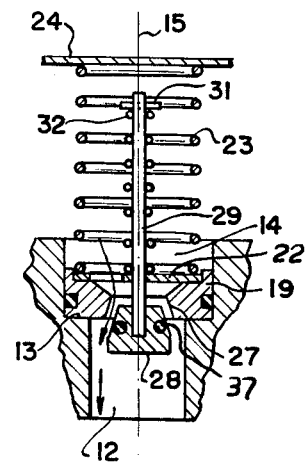
FIG. 3 is a segmented view of the inventive device under the low pressure condition.

FIG. 3 is instrumental in understanding the movement of the various movable elements when a negative pressure exists within the hydraulic reservoir — that is, when a large amount of hydraulic fluid has been removed from the reservoir. Because of the decrease of pressure in the reservoir the pressure on the top of Valve 28 exceeds that on the bottom of the valve, and accordingly the higher pressure on the outside of Valve 28 causes it to move downwardly into Orifice 12, thereby allowing air to pass between Valve 28 through Orifice 27 of High Pressure Ring 19. This movement is against the biasing force of Spring 32 and accordingly Spring 32 determines the low pressure at which Valve 28 opens and closes. It will be noted that the movement of Valve 28 in response to low pressures is unaffected by Spring 23 which biases High Pressure Ring 19 against the Shoulder 13. The opening of low pressure Valve 28 is therefore completely independent of the spring constant of Spring 32. As the pressure in the reservoir increases because of the admission of air, the pressure on the inside surface of Valve 28 also increase, thus offsetting the force exerted on the outside surface of Valve 28. With the outside pressure offset by the inside pressure, Valve 28 responds to the force of Spring 32 and moves upwardly into the orifice of High Pressure Ring 19, thereby shutting off the admission of air into the reservoir.

Because High Pressure Element 19 and Low Pressure Element 28 are individually biased by separate springs, and also because the elements move in unison during the initial part of the high pressure opening, chatter between the movable elements is greatly reduced. This is particularly true when the pressure within the reservoir is approaching that at which the valve mechanisms should close. Chatter is also avoided because Springs 23 and 32 can have different spring constants. Furthermore, a pressure differential exists between the opening pressure of the two valves. This is so because high pressure must act against both springs to effect opening, while low pressure need only act against one spring.

What is claimed is:

1. A breather mechanism responsive to positive and negative pressure changes within a fluid reservoir comprising:

a base member for coupling said breather to said reservoir, said base member having a retaining shoulder and including a fluid flow communication for permitting fluid flow between said breather and said reservoir;

a housing enclosing said base member;

positive and negative pressure responsive means arranged within said fluid flow communication, said pressure responsive means being slidable for a preselected distance within said communication and being configured congruently with said communication so that fluid flow through said communication is prohibited by said pressure responsive member;

said pressure responsive means having an orifice in communication with said fluid flow communication;

a negative pressure member including a valve portion arranged in said orifice, said orifice and said valve portion being congruently configured so that positive pressure in said reservoir prohibits fluid flow through said orifice, said negative pressure member including a stem portion integral with said valve portion, said stem portion extending to the proximity of said housing and being spaced from said housing by a distance less than said preselected distance when said pressure responsive member rests against said shoulder;

first biasing means biasing said pressure responsive means against said shoulder, and second biasing means biasing said valve portion into said orifice, pressure increases in said reservoir sliding said pressure responsive member in said communication against said first biasing means until said stem portion contacts said housing resulting in movement of said valve from said orifice so that fluid flows through said orifice relieving pressure within said reservoir, and pressure decreases within said reservoir moving said valve portion from said orifice against said second biasing means so that fluid flows through said orifice into said reservoir increasing the fluid pressure within said reservoir.

2. The breather of claim 1 further including guide means for said negative pressure member, said guide means being centered with respect to said negative pressure member and being biased against said pressure responsive means by said first biasing means.

* * * * *